Aug. 25, 1953 — R. H. HAGOPIAN — 2,650,289

DIELECTRIC HEATING

Filed Aug. 10, 1949

WITNESSES:

INVENTOR
Richard H. Hagopian.
BY
ATTORNEY

Patented Aug. 25, 1953

2,650,289

UNITED STATES PATENT OFFICE 2,650,289

DIELECTRIC HEATING

Richard H. Hagopian, Baltimore, Md., assignor to Westinghouse Electric Corporation, East Pittsburgh, Pa., a corporation of Pennsylvania Application August 10, 1949, Serial No. 109,593

9 Claims. (Cl. 219—47)

1

This invention relates generally to the high frequency heating of dielectric material; but more particularly relates to dielectric heating of wet or moist materials, such as, for example, foam rubber, etc., that cure and lose moisture under heat.

It is known to provide a high frequency field between a pair of vertically-spaced horizontally-arranged heating-electrodes and to move a dielectrically-heatable material through the field, for rapidly and economically curing or otherwise dielectrically heating the material. In connection with a moist dielectric material such as foam rubber, there are several disadvantages to such an arrangement. The evaporation of moisture from the top exposed surface of the material prevents that portion of the material from reaching the desired curing level, thus causing an undercure of the surface portion. Circulation of hot air or steam over the material as it undergoes heat-treatment in the apparatus has been proposed, but has a tendency to dry the surface.

An important object of my invention is to provide an apparatus of the type described and a method of heating which lack the foregoing disadvantages and obviate the need for extensive additional apparatus such as that needed for an extraneous stream of hot air or steam.

A further object of my invention is to provide means and methods for uniformly dielectrically heating and curing moist plastic materials.

Briefly, the foregoing and other objectives of my invention are achieved through a structure providing an open-ended tunnel of extended length but of limited height through which the material moves as it is heated by an electric field between a pair of heating-electrodes, one of which may be part of the tunnel or is outside of the tunnel. The steam or water vapor liberated from the material by the high frequency power is trapped between the top of the material and the tunnel top wall, and can escape only by sweeping over the surface of the material to the ends of the tunnel. The surface of the material is thus kept hot so that the material cures thoroughly in all of its portions.

Where there is a possibility that moisture driven from the material during heating many condense on the upper heating-electrode and lower the value of the electrical stress which causes sparkover in the space between the upper heating-electrode and the material, it is recommended that the tunnel be made of a dielectric material and the upper heating-electrode placed over it. Otherwise the tunnel can be formed of the upper heating-electrode and dielectric sheets closing

2 the sides between the edges of the upper and lower heating-electrodes.

Features, objects and methods accompanying my invention, in addition to the foregoing, will be discernible from the following description of preferred forms thereof, and the accompanying drawing which are limited to such parts as will be sufficient for an understanding thereof by one skilled in the art. In the drawing, which is not to scale:

Figure 1:
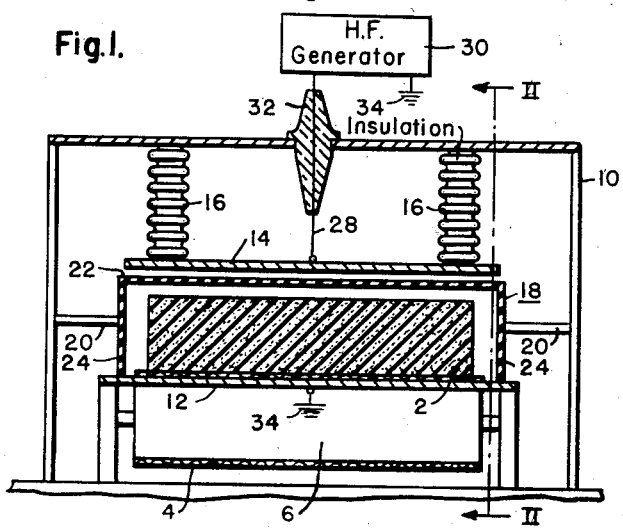
Figure 1 is a transverse vertical sectional view of an embodiment of my invention.

Referring to the embodiment shown in Figs. 1–4, dielectrically heatable work material 2 is carried on an endless belt conveyor means 4 of a dielectric heating equipment. The conveyor 4 comprises a canvas belt driven in the direction of the arrow shown in the drawing by any suitable means including a driving drum 6 and a return drum 8.

The dielectric heating equipment comprises a suitable supporting frame or housing 10 which carries a stationary elongated lower heating-electrode 12 and an elongated upper heating-electrode 14 between which the conveyor means carries the work 2. The lower heating-electrode 12 is secured to the supporting frame 10 in any suitable manner; and the upper heating-electrode 14 is carried from a wall or a bar of the frame-support 10 through a plurality of stand-off insulators 16 so as to be parallel to and vertically spaced from the lower heating-electrode 12. The heating-electrodes provide a work-treating space between them. The insulator 16 insulates the upper heating-electrode 14 from the support 10 and the lower heating-electrode 12.

The support 10 also carries a tunnel member 18 through supporting means 20 extending from side-bars of the support. The tunnel member 18 has a cross section having inverted U-shape and comprises a solid top wall 22 and solid side walls 24. Preferably, the member 18 has a length which is at least substantially coextensive with that of the upper heating-electrode 14; and the bottoms of its sides terminate at or near the lower heating-electrode 12. Consequently, the elongated member 18 and the elongated lower electrode 12 cooperate to form an open-ended tunnel. The space inside the tunnel forms a region through which the upper lay or run of the conveyor means 4 moves the work 2. Preferably this lay or run 4 rides on and is supported by the heating-electrode 12. The member 18 is made of a low loss dielectric material such as, for example, rubber.

An electric field is established between the electrode-means 12 and 14 by any suitable means. Such means is schematically represented in Fig. 1 by an insulated conductor 28 which is connected to the insulated side of a high tube-oscillator frequency generator 30. The conductor 28 passes through an insulating bushing 32 to the heating-electrode 14. The other side of the generator is connected to the heating-electrode 12, and the connection may include ground as indicated at 34.

Figure 2:
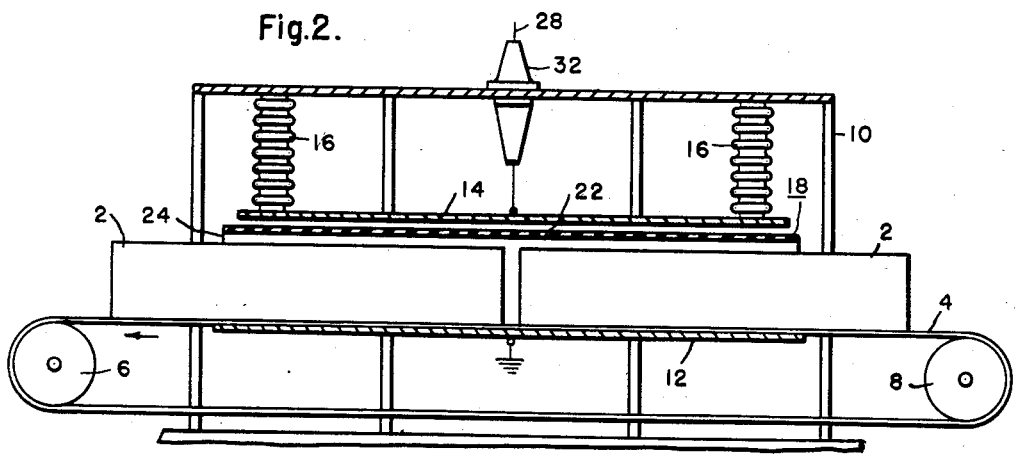
Fig. 2 is a longitudinal sectional view of the apparatus of Fig. 1.

Apparatus of the foregoing type is suitable for heating material such as foam rubber. Fig. 2 shows two masses or slabs of foam rubber being carried by the conveyor means 4 through the tunnel provided by the member 18 and heating-electrode 12. The top wall 22 of the tunnel is near the top of the rubber slabs so that the moisture from the heated slabs has a confined path and must sweep over the top of the work material 2 to escape through the openings at the ends of the open ended tunnel. Consequently, the surfaces of the rubber slabs are kept moist and hot, and will reach a satisfactory curing temperature. As an example of equipment for so curing foam rubber slabs 40 to 72 inches wide and up to 6 inches thick, heating-electrodes 16 feet long and spaced apart 7 inches were associated with a tunnel member 18 having a height of somewhat less than 7 inches and a length of 25 feet. The heating-electrodes were energized by a hundred kilowatt tube-oscillator generator operating at 13.6 megacycles. Foam rubber 2 inches thick was thoroughly cured while traveling at a speed of 2 feet per minute through the heating tunnel and without the addition of steam or water vapor from an external source.

The heating tunnel can be longer than the upper heating-electrode, two to three times as long, more or less. The high-frequency energy between the heating-electrodes then can be used to pre-heat the material to 212° F. to generate steam, and the material will continue to cure while passing through the rest of the steam-filled tunnel.

Figure 3:
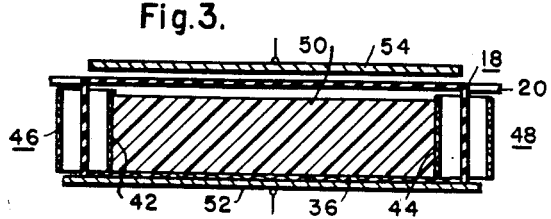
Fig. 3 is a fragmentary transverse sectional view of a detail utilizable with my invention.

Foam rubber generally has the consistency of a jelled mass before it is passed into the dielectric heating apparatus, so that it is self-supporting. Should a plastic mass have a consistency that it is not fully self-supporting, side belt traveling at the same speed as the work-receiving conveyor 4 may be provided, as shown in Fig. 3. In Fig. 3, a canvas belt has a level work-carrying run 36 which moves in the same direction as the inner runs 42 and 44 of side belts 46 and 48, respectively, so that the mass of plastic-work 50 will be prevented from spreading out until it has been sufficiently heated between heating-electrodes 52 and 54 so as to have a shape that is self-supporting.

Figure 4:
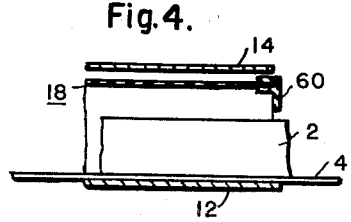
Fig. 4 is a simplified fragmentary transverse sectional view of a further modification of my invention.

If desired, the extreme ends of the tunnel member 18 can be provided with detachable end flaps 60 as shown in Fig. 4. By means of these end flaps, the rate at which the steam or moisture can escape from the ends of the tunnel can be controlled, it being understood that any end flap can be removed from the member 18 and one of different size or width substituted. The flaps can also be advantageously used with varying heights of work-material on the conveyor means 4.

It is to be noted that the space between the top wall 22 of the tunnel member 18 and the upper heating-electrode 14 is not saturated with moisture or other liquid that may be driven from the material being heated. The height of this space obviously can be controlled as desired.

Figure 5:
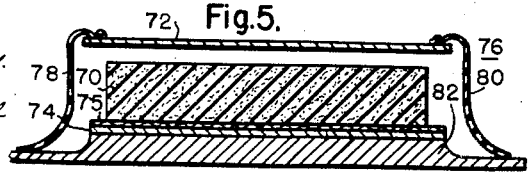
Fig. 5 is a transverse sectional view of a modified form of my invention, in which the upper heating-electrode is part of a tunnel.

In the embodiment shown in Fig. 5 the tunnel is formed with the upper heating-electrode as a part thereof. Foam rubber 70 is placed or carried between an upper heating-electrode 72 and a lower heating-electrode 74 by a work-carrying support 75 that may be a conveyer if desired. The upper heating-electrode forms the top of a tunnel member 76 which also comprises thin rubber sheets 78 and 80 secured to the upper heating-electrode and extending from the longitudinal edges of the upper heating-electrode downwardly to the solid support 82 of the lower heating-electrode. Preferably the sheets 78 and 80 are at least as long as the upper heating-electrode, and additional insulation wall-means can be added to one or both ends of the upper-heating electrode for a longer tunnel member.

While I have described my invention in simplified form, it is obvious that its teachings are applicable to a wide range of different embodiments useful for heat-treating moist materials.

I claim as my invention:

1. High-frequency apparatus comprising in combination an elongated and substantially rigid tunnel member having only a top and insulating sides, upper and lower heating electrodes, said tunnel member being positioned in the space between said heating electrodes with said upper heating electrode being at the top of said tunnel, and said lower heating electrode being adapted to form a bottom member for said tunnel member, and with the sides of the tunnel member extending between said heating electrodes and substantially perpendicular relative thereto for a distance substantially equal to said space between the heating electrodes.

2. Apparatus in accordance with that of claim 1 in which said upper heating-electrode integrally forms at least a part of said tunnel top.

3. Apparatus in accordance with that of claim 1 in which said upper heating-electrode is slightly above said tunnel top.

4. High-frequency heating apparatus comprising, in combination, upper and lower elongated heating-electrodes spaced to provide a space between them, said heating-electrodes being adapted to be energized with high-frequency electrical energy for providing an electric field across said space, work-supporting means to support dielectric work-material in said space, and a dielectric member in the form of an elongated work path surrounding tunnel member including a first portion parallel to said electrodes and at least a second and third portion, the latter portions being fastened to and extending perpendicularly away from said first portion, said member being positioned in said space between said electrodes such that said first portion is located slightly above the work material, and said second and third portions are on respectively opposite sides of said work material and to substantially cover said work-material.

5. High frequency heating apparatus comprising, in combination, an upper heating-electrode, a lower heating-electrode, a supporting means carrying said upper and lower heating-electrodes in spaced relatively insulated relation, connection means for energizing said heating electrodes with high frequency electrical energy to provide an electric field across the space between said heating electrodes, conveyor means for passing dielectrically-heatable material through said space, and a dielectric wall means carried by said supporting means, said dielectric wall means comprising a top member and a pair of perpendicularly extending wall-members attached to said top member, said dielectric wall means being positioned along both sides of said lower heating electrode such that said lower heating electrode is located between said pair of extending wall-members but spaced therefrom, such that a tunnel member is formed, said tunnel member surrounding said material, said tunnel member being elongated and positioned to provide a clearance space between said top member and said material.

6. An apparatus in accordance with claim 5, in which the top member is located below and spaced from said upper heating electrode.

7. High-frequency heating apparatus comprising, in combination, a conveyor means, an elongated open ended member having a cross-section which is generally U-shaped, said member being of dielectric material and positioned with respect to said conveyor means to provide an open-ended tunnel therewith for closely encompassing dielectrically-heatable work on said conveyor means, a pair of elongated relatively insulated electrode-means energizable with high-frequency electrical energy to provide an electric field transversely across said tunnel, at least one of said electrode-means being outside of said tunnel, and said open-ended member being fixedly positioned relative to said electrode-means.

8. High-frequency heating apparatus comprising, in combination, an elongated open-ended tunnel having spaced sides, a pair of said sides of said tunnel being of substantially flexible insulating material, conveyor means to move dielectrically-heatable material lengthwise through said tunnel, a first elongated heating electrode-means spanning the space between said sides, a second elongated heating electrode-means spaced and insulated from said first electrode-means, said electrode-means being positioned at respectively opposite ends of said sides to form said tunnel member therewith, said electrode-means being adapted to provide a high-frequency electric field in said tunnel for heating said material, with said spaced sides being in the form of respectively a pair of continuous belt members and adapted to move respectively at the same rate as said conveyor means.

9. High-frequency heating apparatus comprising, in combination, an elongated open-ended tunnel having spaced sides, a pair of said sides of said tunnel being of substantially flexible insulating material, conveyor means to move dielectrically-heatable material lengthwise through said tunnel, a first elongated heating electrode-means spanning the space between said sides, a second elongated heating electrode-means spaced and insulated from said first electrode-means, said electrode-means being positioned at respectively opposite ends of said sides to form said tunnel member therewith, said electrode means being adapted to provide a high-frequency electric field in said tunnel for heating said material, with said flexible sides being in the form of respectively a pair of continuous belt members and adapted to move with said material as the latter moves through the tunnel.

RICHARD H. HAGOPIAN.

References Cited in the file of this patent

UNITED STATES PATENTS

| Number | Name | Date |
| --- | --- | --- |
| 2,054,937 | Kremer | Sept. 22, 1936 |
| 2,231,457 | Stephen | Feb. 11, 1941 |
| 2,428,615 | Brown | Oct. 7, 1947 |
| 2,441,235 | Blair et al. | May 11, 1948 |
| 2,441,548 | Sperry | May 11, 1948 |
| 2,441,699 | Gramelspacher | May 18, 1948 |
| 2,463,289 | Leguillon | Mar. 1, 1949 |
| 2,473,251 | Hsu | June 14, 1949 |
| 2,489,135 | Himmel et al. | Nov. 22, 1949 |
| 2,508,365 | Bierwirth | May 23, 1950 |
| 2,560,763 | Griffith, Jr. | July 17, 1951 |
| 2,580,200 | Shrimpton | Dec. 25, 1951 |
| 2,582,806 | Nes et al. | Jan. 15, 1952 |
| 2,586,328 | Hagopian | Feb. 10, 1952 |
| 2,603,741 | Seifried et al. | July 15, 1952 |